US009697834B2

(12) United States Patent
Bisani et al.

(10) Patent No.: US 9,697,834 B2
(45) Date of Patent: Jul. 4, 2017

(54) TEXT FORMATTER WITH INTUITIVE CUSTOMIZATION

(75) Inventors: Maximilian Bisani, Limbourg (BE); Olivier Divay, Vieux-Vy sur Couesnon (FR); Jeffrey S. Kobal, Wellington, FL (US)

(73) Assignee: Nuance Communications, Inc., Burlington, MA (US)

( * ) Notice: Subject to any disclaimer, the term of this patent is extended or adjusted under 35 U.S.C. 154(b) by 151 days.

(21) Appl. No.: 14/416,955

(22) PCT Filed: Jul. 26, 2012

(86) PCT No.: PCT/US2012/048295
§ 371 (c)(1),
(2), (4) Date: May 11, 2015

(87) PCT Pub. No.: WO2014/018039
PCT Pub. Date: Jan. 30, 2014

(65) Prior Publication Data
US 2015/0262580 A1 Sep. 17, 2015

(51) Int. Cl.
*G10L 15/26* (2006.01)
*G06F 17/21* (2006.01)

(52) U.S. Cl.
CPC ............ *G10L 15/26* (2013.01); *G06F 17/211* (2013.01)

(58) Field of Classification Search
CPC ............... G10L 15/22; G10L 2015/223; G10L 2015/228
See application file for complete search history.

(56) References Cited

U.S. PATENT DOCUMENTS

| 6,064,957 | A  | * | 5/2000 | Brandow | G06F 17/2211 |
|-----------|----|---|--------|---------|--------------|
|           |    |   |        |         | 704/231      |
| 6,064,959 | A  | * | 5/2000 | Young   | G10L 15/22   |
|           |    |   |        |         | 704/251      |
| 6,195,637 | B1 | * | 2/2001 | Ballard | G10L 15/22   |
|           |    |   |        |         | 704/235      |
| 6,374,226 | B1 | * | 4/2002 | Hunt    | G10L 15/26   |
|           |    |   |        |         | 704/255      |
| 8,676,577 | B2 | * | 3/2014 | Jablokov | 704/235     |

(Continued)

OTHER PUBLICATIONS

Notification Concerning Transmittal of International Preliminary Report on Patentability (Chapter I of the Patent Cooperation Treaty) from PCT/US2012/048295, entitled "Text Formatter with Intuitive Customization", Date of Mailing: Feb. 5, 2015.

(Continued)

*Primary Examiner* — Brian Albertalli
(74) *Attorney, Agent, or Firm* — Hamilton, Brook, Smith & Reynolds, P.C.

(57) ABSTRACT

A computer implemented method and system of formatting text output from a speech recognition system is provided. The method includes determining if a user correction to a text output from a speech recognition system can be accomplished by changing a formatting setting associated with the speech recognition system. The formatting setting is changed based on an inferential indication that the change to the formatting setting is acceptable to the user and/or an explicit confirmation from the user that the change to the formatting setting is acceptable.

20 Claims, 6 Drawing Sheets

(56) References Cited

U.S. PATENT DOCUMENTS

| | | | |
|---|---|---|---|
| 8,688,448 B2* | 4/2014 | Peters | G06F 17/27 704/236 |
| 9,396,166 B2* | 7/2016 | Rosen | G06F 17/211 |
| 2004/0138881 A1* | 7/2004 | Divay | G06F 17/2725 704/231 |
| 2004/0186714 A1* | 9/2004 | Baker | G10L 15/08 704/236 |
| 2005/0099398 A1 | 5/2005 | Garside et al. | |
| 2005/0108010 A1* | 5/2005 | Frankel | G06F 17/27 704/235 |
| 2005/0114122 A1* | 5/2005 | Uhrbach | G06F 17/211 704/220 |
| 2007/0033026 A1* | 2/2007 | Bartosik | G06F 17/273 704/233 |
| 2007/0083366 A1 | 4/2007 | Peters | |
| 2007/0271086 A1* | 11/2007 | Peters | G06F 17/211 704/9 |
| 2008/0243483 A1 | 10/2008 | Schmid et al. | |
| 2009/0124272 A1* | 5/2009 | White | G10L 15/30 455/466 |
| 2009/0192787 A1 | 7/2009 | Roon | |
| 2009/0248415 A1* | 10/2009 | Jablokov | G10L 15/30 704/251 |
| 2010/0318356 A1* | 12/2010 | Hamaker | G10L 15/19 704/251 |

OTHER PUBLICATIONS

International Search Report and Written Opinion, PCT/US2012/048295, entitled "Text Formatter With Intuitive Customization," date of mailing Sep. 28, 2012.

\* cited by examiner

Alice —— didn't —— change —— the —— capitalization

TEXT FORMATTER WITH INTUITIVE CUSTOMIZATION

This application is the U.S. National Stage of International Application No. PCT/US2012/048295, filed Jul. 26, 2012, which designates the U.S., and is published in English.

TECHNICAL FIELD

The present invention relates to speech recognition for dictation, and more particularly to customizing user preferences for how dictated text is formatted and/or spelled.

BACKGROUND ART

Generally, speech recognition for dictation works in two steps. First, speech recognition converts a speech audio signal into a verbatim transcript, which is a sequence of words (tokens). Second, formatting renders the tokens to form a written document. Examples of formatting include:
spacing: How many spaces before/after punctuation?
numbers: "twenty three"→"23" or "twenty-three" or "XXIII"
spelling variation: "dialing" or "dialling"
abbreviations: "Incorporated" or "Inc."
units of measure "ten miles" or "10 mi."
dates: "October thirteenth two thousand nine"→"Oct 13, 2009", or "10/13/09", or "2009-10-13", . . . .
addresses: "one wayside road Burlington Massachusetts"→"1 Wayside Rd. Burlington, MA"

Figure 1:
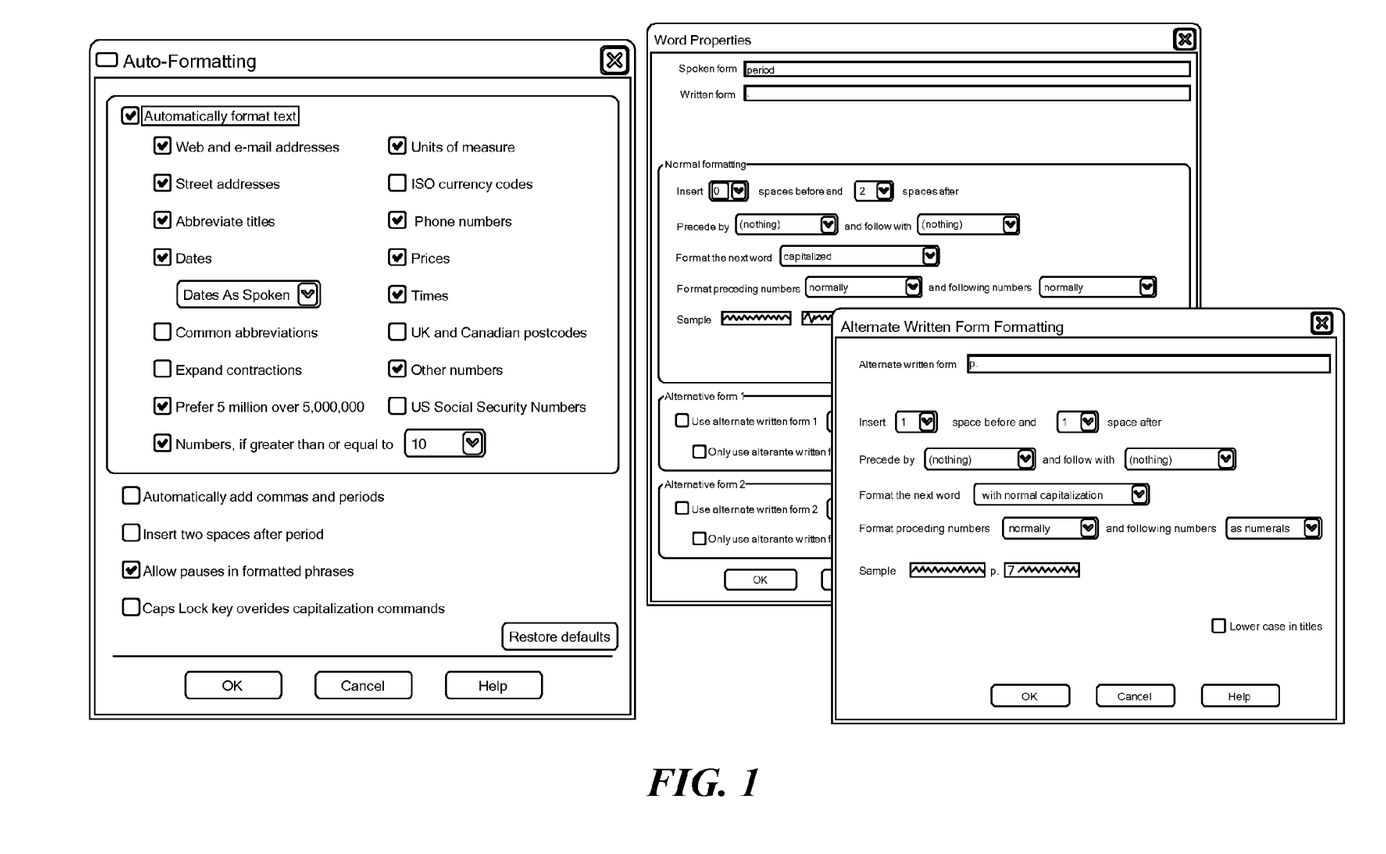
FIG. 1 shows exemplary screen shots of an GUI used for setting formatting options.

Typically, the user can customize the formatted output by setting various options. These options may be set by the user using, for example, a Graphical User Interface (GUI). FIG. 1 shows exemplary screen shots of a GUI used for setting formatting options. The formatter itself is typically based on a context-free grammar that recognizes formatted expressions such as number and dates. The productions of the grammar are associated with executable code that generates the formatted output taking into account the options settings.

If the system output does not match user expectations, users correct the recognized and formatted text. Whether the error is in recognition or in formatting, users do not know. Recognition improves from user feedback, since language and acoustic models are adapted on data provided by the user and on corrections. Formatting, on the other hand, completely ignores user data and corrections. Since non-technical users hardly explore the GUI to change formatting option settings, they keep correcting the same formatting errors repeatedly, leading to user frustration.

SUMMARY OF THE EMBODIMENTS

In accordance with a first embodiment of the invention, a computer implemented method of formatting text output from a speech recognition system is provided. The method includes determining if a user correction to a text output from a speech recognition system can be accomplished by changing a formatting setting associated with the speech recognition system. The formatting setting is changed based on based on an inferential indication that the change to the formatting setting is acceptable to the user and/or an explicit confirmation from the user that the change to the formatting setting is acceptable.

In accordance with related embodiments of the invention, changing the formatting setting based on an explicit confirmation from the user may include providing via a user interface at least one option to the user to change the formatting setting. The formatting setting is changed if the user accepts one or more of the options. Prior to providing the at least one option to the user to change the formatting setting, the option to change to the formatting setting may be tested by formatting the text output with the change to the formatting setting incorporated to produce a candidate text. The user correction is compared to the candidate text. If the candidate text matches the user correction to the text output, the option is provided to the user. If the candidate text does not match the user correction to the text output, the option is not provided to the user.

In accordance with further related embodiments of the invention, changing the formatting setting based on an inferential indication may include monitoring previously made corrections and/or how often text similar to the text output is tacitly accepted by the user without making a correction. The formatting setting is changed based, at least in part, on the previously made corrections and/or how often text similar to the text output is tacitly accepted by the user without making a correction.

In accordance with still further related embodiments of the invention, changing the formatting setting based on an inferential indication may include changing the formatting setting based, at least in part, the formatting of pre-existing text.

In accordance with yet further related embodiments of the invention, the formatting setting may be associated with a spacing, a numbering, a spelling variation, a capitalization, an abbreviation, a contraction, a number, a unit of measure, a price, a date, a time, an address, an e-mail address, a web address, a phone number, masking of foul language, a legal citation, a dosage, a blood pressure and/or a vertebra number. Determining if a user correction to text output from the speech recognition system can be accommodated by changing a formatting setting associated with the speech recognition system may include using a formatting graph representing alternative formatted texts of a token sequence associated with the text output.

In accordance with another embodiment of the invention, a speech recognition system for outputting text based on a spoken utterance includes an adaptation component. The adaptation component determines if a user correction to text output from the speech recognition system can be accomplished by changing a formatting setting associated with the speech recognition system. The formatting setting is changed based, at least in part, on an inferential indication that the change to the formatting setting is acceptable to the user and/or an explicit confirmation from the user that the change to the formatting setting is acceptable.

In accordance with related embodiment of the invention, a user interface may provide at least one option to the user to change the formatting setting, wherein the user can provide explicit confirmation via the user interface that one or more of the options to change the formatting setting are acceptable.

In accordance with further related embodiments of the invention, prior to providing the at least one option to the user to change the formatting setting, the adaptation component may tests each option to change the formatting setting by formatting the text output, with the change to the formatting setting incorporated, to produce a candidate text. If the candidate text matches the user correction to the text output, the option is provided to the user. If the candidate text does not match the user correction to the text output, the option is not provided to the user.

In accordance with still further embodiments of the invention, the inferential indication may be based, at least in part, on previous corrections to formatted text monitored by the adaptation component module. The formatting setting may be associated with a spacing, a numbering, a spelling variation, a capitalization, an abbreviation, a contraction, a number, a unit of measure, a price, a date, an address, an e-mail address, a web address, a phone number, masking of foul language, a legal citation, a dosage, a blood pressure and/or a vertebra number. The adaptation component may use a formatting graph representing alternative formatted texts of the output in determining if a user correction to text output from the speech recognition system can be accommodated by changing a formatting setting associated with the speech recognition system.

In accordance with another embodiment of the invention, a computer implemented method of formatting text in a speech recognition system is provided that includes changing a formatting setting associated with the speech recognition system based, at least in part, on the formatting of pre-existing text.

In accordance with related embodiments of the invention, changing the formatting setting may include changing the formatting setting only after receiving explicit confirmation from a user that the change to the formatting setting is acceptable. Changing the formatting setting may include providing via a user interface at least one option to a user to change the formatting setting. The formatting setting is then changed if the user accepts one or more of the options. The formatting setting may be associated with a spacing, a numbering, a spelling variation, a capitalization, an abbreviation, a contraction, a number, a unit of measure, a price, a date, a time, an address, an e-mail address, a web address, a phone number, masking of foul language, a legal citation, a dosage, a blood pressure and/or a vertebra number. Changing the formatting setting may include using a formatting graph representing alternative formatted texts of a token sequence associated with text output from the speech recognition system.

In accordance with another embodiment of the invention, a speech recognition system for outputting text based on a spoken utterance includes an adaptation component for changing a formatting setting associated with the speech recognition system based, at least in part, on the formatting of pre-existing text.

In accordance with related embodiments of the invention, the adaptation component may be further configured to change the formatting setting only after receiving explicit confirmation from a user that the change to the formatting setting is acceptable. A user interface may provide at least one option to a user to change the formatting setting, whereupon the user can provide via the user interface, explicit confirmation that one or more of the options to change the formatting setting are acceptable. The formatting setting may be associated with a spacing, a numbering, a spelling variation, a capitalization, an abbreviation, a contraction, a number, a unit of measure, a price, a date, an address, an e-mail address, a web address, a phone number, masking of foul language, a legal citation, a dosage, a blood pressure and/or a vertebra number. Changing the formatting setting may include using a formatting graph representing alternative formatted texts of a token sequence associated with text output from the speech recognition system.

In accordance with another embodiment of the invention, a non-transitory computer program product for formatting text output from a speech recognition engine is provided. The computer program product includes a non-transitory computer usable medium having executable computer readable program code thereon for execution by a computer. The computer readable program code includes program code for determining if a user correction to a text output from a speech recognition system can be accomplished by changing a formatting setting associated with the speech recognition system. The computer readable program code further includes program code for changing the formatting setting based on inferential indication that the change to the formatting setting is acceptable to the user and/or an explicit confirmation from the user that the change to the formatting setting is acceptable.

In accordance with related embodiments of the invention, the program code for changing the formatting setting based on an confirmation from the user may include program code for providing via a user interface at least one option to the user to change the formatting setting, and changing the formatting setting if the user accepts one or more of the options.

In accordance with further related embodiments of the invention, the program code for changing the formatting setting based on an inferential indication may include program code for monitoring previously made corrections and/or how often text similar to the text output is tacitly accepted by the user without making a correction. The formatting setting is changed based, at least in part, on the previously made corrections and/or how often text similar to the text output is tacitly accepted by the user without making a correction.

In accordance with yet further related embodiments of the invention, the formatting setting may be associated with a spacing, a numbering, a spelling variation, a capitalization, an abbreviation, a contraction, a number, a unit of measure, a price, a date, a time, an address, an e-mail address, a web address, a phone number, masking of foul language, a legal citation, a dosage, a blood pressure and/or a vertebra number. The program code for determining if a user correction to text output from a speech recognition engine can be accommodated by changing a formatting setting associated with the speech recognition system may include program code for using a formatting graph representing alternative formatted texts of a token sequence associated with the text output.

In accordance with another embodiment of the invention, a non-transitory computer program product for formatting text output from a speech recognition engine is provided. The computer program product includes a non-transitory computer usable medium having executable computer readable program code thereon for execution by a computer. The computer readable program code includes program code for changing a formatting setting associated with the speech recognition system based, at least in part, on the formatting of pre-existing text.

In accordance with related embodiments of the invention, the program code for changing the formatting setting may include program code for changing the formatting setting only after receiving explicit confirmation from a user that the change to the formatting setting is acceptable. The program code for changing the formatting setting based on an confirmation from the user may include program code for providing via a user interface at least one option to the user to change the formatting setting, and changing the formatting setting if the user accepts one or more of the options. The formatting setting may be associated with a spacing, a numbering, a spelling variation, a capitalization, an abbreviation, a contraction, a number, a unit of measure, a price, a date, a time, an address, an e-mail address, a web address, a phone number, masking of foul language, a legal citation, a dosage, a blood pressure and/or a vertebra number. The computer code may use a formatting graph representing alternative formatted texts of a token sequence associated with text output from the speech recognition system.

BRIEF DESCRIPTION OF THE DRAWINGS

The foregoing features of embodiments will be more readily understood by reference to the following detailed description, taken with reference to the accompanying drawings, in which:

FIGS. 5(a-h) show use of a formatting graph, in accordance with an embodiment of the invention.

DETAILED DESCRIPTION OF SPECIFIC EMBODIMENTS

In illustrative embodiments, a method and system enables a speech recognition system to recognize when a user correction corresponds to a difference in formatting preferences. Based on the user correction, the speech recognition system proceeds to change formatting settings based on explicit confirmation from the user and/or an inferential indication that the change to the formatting setting is acceptable to the user. Thus, in various embodiments, formatting preferences of the user can be changed without the user having to understand option settings and/or use a Graphical User Interface (GUI). Details and further embodiments are described below.

Figure 2:
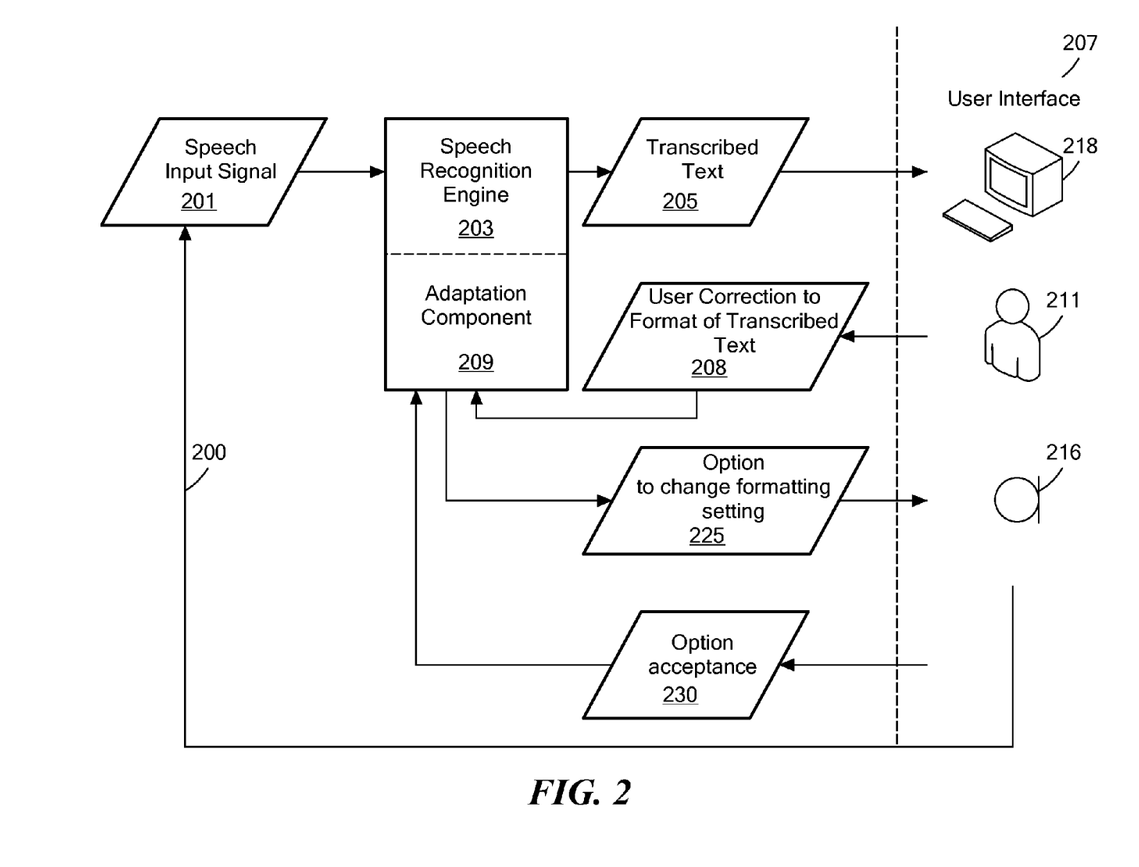
FIG. 2 shows a functional block diagram in a speech recognition engine, in accordance with an embodiment of the invention.
Figure 3:
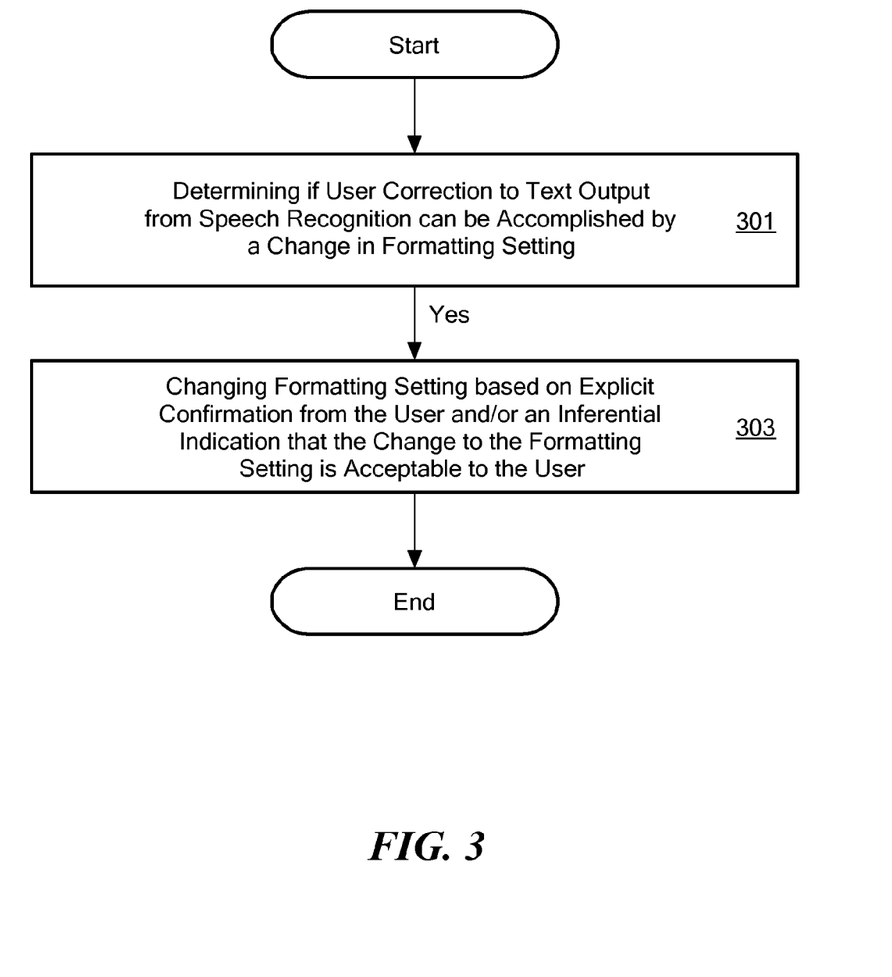
FIG. 3 shows various steps performed by a speech recognition system, in accordance with an embodiment of the invention.

FIG. 2 shows a functional block diagram of a speech recognition system 200, in accordance with an embodiment of the invention. FIG. 3 shows various steps performed by the speech recognition system 200 according to an embodiment of the invention. Initially, a speech utterance of a user 211 is converted into a representative electrical speech input signal 201. For example, this may be based on the use of a conventional microphone 216.

The speech input signal is received by a speech recognition engine 203. The speech recognition engine 203 may include, without limitation, one or more computer processes on at least one hardware implemented processors. The speech recognition engine 203 illustratively converts a speech audio signal into a verbatim transcript, which may include sequences of words (i.e., tokens). Secondly, speech recognition engine 203 formatting renders the tokens to form transcribed text, step 205. The speech recognition engine 203 includes various formatting settings options. Formatting settings may be associated with, for example and without limitation, a spacing, a numbering, a spelling variation (as opposed to spelling error), a capitalization, an abbreviation, a contraction, a number, a unit of measure, a price, a date, a time, an address, an e-mail address, a web address, a phone number, masking of foul language, a legal citation, a dosage, a blood pressure and/or a vertebra number.

The written transcribed text is provided to, and reviewed by, the user 211. More particularly, the speech recognition engine 203 may output the transcribed text to a user interface 207 via a hardwired or wireless interface, step 205. The user interface 207 may include, among other things, a display 218 associated with, for example, a computer, phone, or tablet that enables review of the text 205 by the user 211, and/or one or more user input devices, such as the microphone 216, a keyboard, a mouse, and/or a touch panel. Upon reviewing the transcribed text, the user 211 may provide one or more formatting corrections via the user interface 207, step 208. For example, the user 211 may make a formatting correction by, without limitation, using a correction menu, or by overtyping the transcribed text, in which case there may be a heuristic to determine when a user is done correcting a section of the transcribed text.

In illustrative embodiments of the invention, an adaptation component 209 associated with the speech recognition engine 203 determines if the user correction 208 to transcribed text output from the speech recognition engine 203 can be accomplished by a change in a formatting setting associated with the speech recognition engine 203, step 301. As used in this description and the accompanying claims, the adaptation component 209 may include a hardware implemented processor and/or one or more computer processes that interface with, or which may be incorporated into, or be considered part of, the speech recognition engine 203. Based on explicit confirmation from the user and/or an inferential indication that the change to the formatting setting is acceptable to the user 211, the formatting setting is changed by the adaptation component 209, step 303.

In those embodiments in which the user 211 makes an explicit confirmation that the formatting change is acceptable, the adaptation component 209 may, upon the user 211 making a formatting change, provide the user 211 with an option(s) to change the formatting setting, step 225. For example, the speech recognition engine 203 may recognize the following token sequence "Alice didn't change the capitalization." Assuming the current formatting settings state that contractions are left as dictated, and a word rewrite rule "capitalization→capitalization" is active, the transcribed output text 205 provided to the user 211 is "Alice didn't change the capitalization." Upon review, the user 211 makes a user correction 208 to "Alice did not change the capitalization." The adaptation component 209 may then provide the user 211 with an option to change the formatting setting to "always expand contraction." The option may be displayed, for example, on a pop-up menu on a display associated with the user interface 207. In further embodiments, the option may be displayed in an application-wide notification center.

Figure 4:
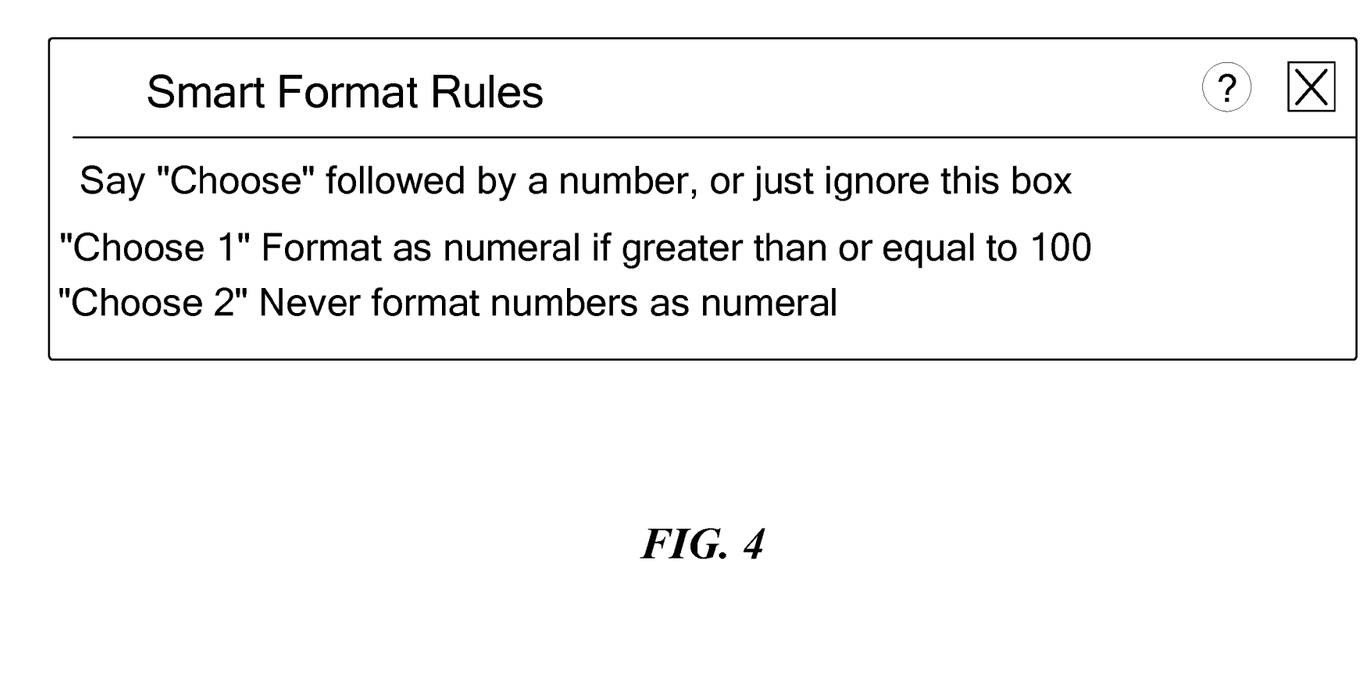
FIG. 4 shows an exemplary screen shot of a display window provided to the user providing multiple formatting options, in accordance with an embodiment of the invention.

A single formatting correction made by the user 211 may cause one or multiple formatting change options to be provided to the user 211 via, for example, user interface 207. FIG. 4 shows an exemplary screen shot of a display window provided to the user 211 providing multiple formatting options. The user may make the correction via, without limitation, typing on the keyboard, or by selecting from a choice list.

The user 211 may accept one or more of the options, via, for example, user interface 207, thus providing explicit confirmation that the change to the formatting is acceptable, step 230. Illustratively, the user 211 may accept an option(s) via, without limitation, a mouse click, a voice command, pressing a touch display, and/or by keyboard entry. For example, upon seeing the window shown in FIG. 4, the user 211 may say "choose 1" into microphone 216, providing an explicit confirmation that the user 211 would like to have format setting "format as number if greater than or equal to 100" set. Upon acceptance, the adaptation component 209 changes the formatting setting. The change in the formatting setting may occur substantially immediately after user selection (taking into account the processing time needed to change the setting).

Prior to providing the option to the user 211 to change the formatting setting, the adaptation component 209 may test the change to the formatting setting. For example, the adaptation component 209 may format the text output with the change to the formatting setting incorporated so as to produce a candidate text. The user correction is then compared the candidate text. If the candidate text matches the user correction to the text output, the option to change the formatting is provided to the user 211. If the candidate text does not match the user correction to the text output, the option is not provided to the user 211.

As indicated above, an inferential indication, as opposed to an explicit confirmation from the user, may be used to indicate that the change to the formatting setting is acceptable. For example, the adaptation component 209 may monitor previously made user corrections and/or how often similar, previously outputted text is tacitly accepted by the user without making a correction. The formatting setting(s) may then be changed based, at least in part, on the previously made corrections and/or the tacit acceptance of similar, previously outputted text without correction.

Illustratively, if the number of previously made, similar user corrections passes a pre-defined threshold, the adaptation component 209 may proceed to change the formatting setting, automatically without an explicit confirmation from the user 211. Alternatively, if the number of similar user corrections passes a threshold, the formatting option can then be presented to the user.

In a further example, the number of times the user leaves "capitalization" or "capitalisation" in the text, for example, via correction or because this is the current setting, may be monitored. The ratio of "capitalization" to "capitalisation" may then be considered (e.g., the ratio of the counts of the corresponding tags), and if it exceeds a certain threshold (e.g., 2), the formatting option for "capitalization" may be chosen. If the ratio is below (e.g., ½) the formatting option for "capitalisation" may be chosen. If the user is undecided the ratio will stay between the thresholds. For an adverse user, who, for example, changes his preference each time a setting is switched, the time between each switch gets longer and longer, effectively de-escalating the conflict. In various embodiments, weighting may be utilized. For example, recent occurrences of text may be weighed more heavily than older occurrences.

To determine if a user correction to text output from the speech recognition system can be accommodated by changing a formatting setting associated with the speech recognition system, a formatting graph may be used that represents alternative formatted texts associated with the text output. Illustratively, given a particular token sequence recognized by the speech recognition processor (and then formatted to produce the text output), a directed acyclic graph may be constructed that represents all possible alternative formatted output texts in a compact way. This may be done via a modified formatting grammar that produces all possible formatting results for each top-level production instead of only the one result mandated by the current format option settings. In addition, each alternative formatting result added to the graph may be annotated with a tag that identifies the corresponding formatting option. For example, if the token sequence recognized by the speech recognition engine is "February seventh two thousand twelve" the graph may include "Feb 7, 2012" with tag DateFormat=1, and "2/7/2012" with tag DateFormat=2, and so forth.

When the user makes a correction, a path through the graph that matches the corrected text is determined. If such a path exists, the user correction is formatting-related, and there may be formatting option settings that would produce the desired result. The path corresponding to the original, uncorrected text output from the speech recognition is also known. A comparison can then be done of the sets of tags on the original path and the corrected path to identify possible changes to the format setting. For example, if the user changes "Feb 7, 2012" to "2/7/2012", a determination can be made that, going from the original, uncorrected text output to the user corrected text, the tag DateFormat=1 is removed and DateFormat=2 is added. Thus, automatically, and/or upon an explicit confirmation and/or inferential indication from the user, this change to the formatting setting can be changed by the adaptation component.

Another example of a use of a formatting graph will now be described with the help of FIG. 5, in accordance with an embodiment of the invention. In this example (also described above), the speech recognition engine recognizes the token sequence "Alice didn't change the capitalization", shown in FIG. 5(a). Assuming the current formatting settings state that contractions are left as dictated, and a word rewrite rule "capitalization→capitalisation" is active, the transcribed output text provided to the user is "Alice didn't change the capitalisation." Upon review, the user makes a user correction to "Alice did not change the capitalisation."

Figure 5A:
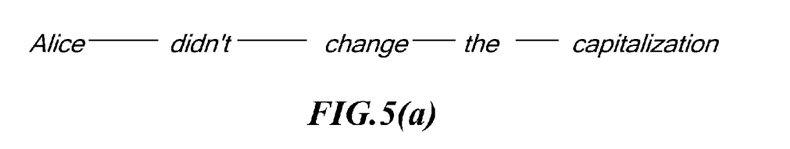
Figure 5B:
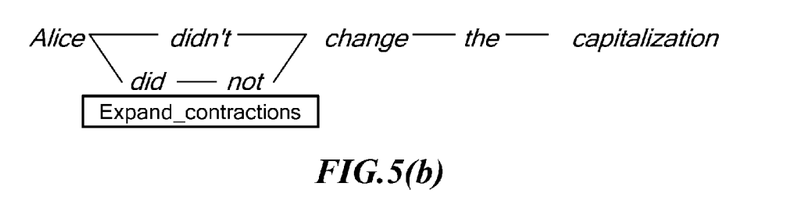
Figure 5C:
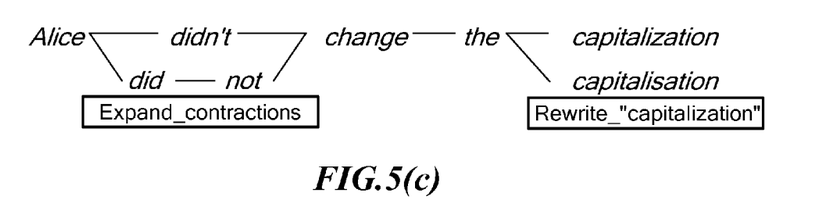
Figure 5D:
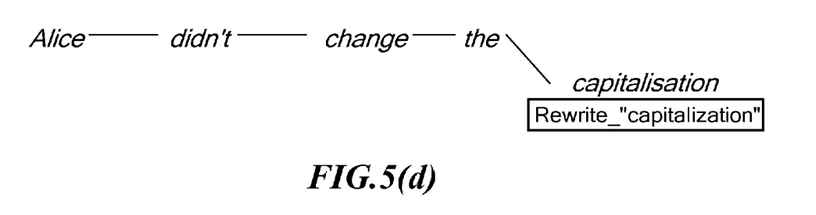
Figure 5E:
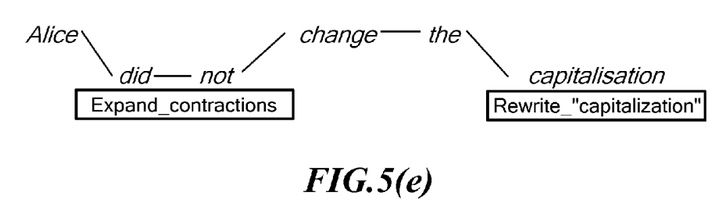
Figure 5F:
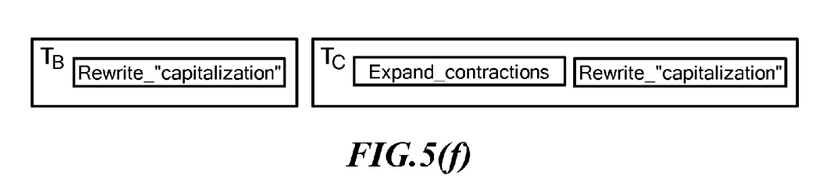
Figure 5G:
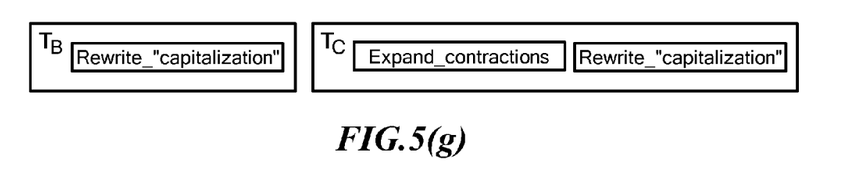
Figure 5H:
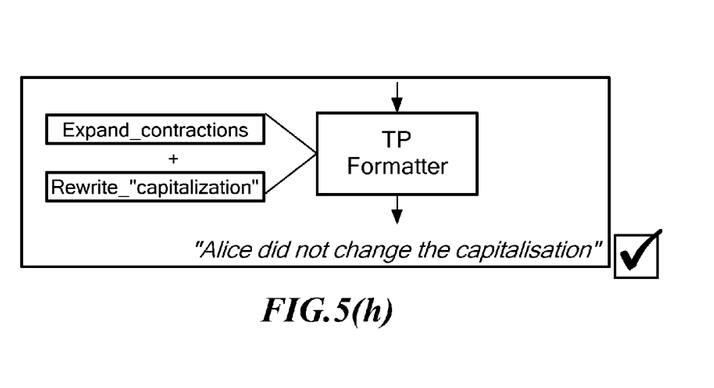

A simple formatting graph A that includes just the word token sequence recognized by the speech recognition engine is constructed, shown in FIG. 5(a). All possible grammar parses of the word sequence are added to graph A, tagging each parse with the formatting parameter settings that would generate it, as shown in FIG. 5(b). For each word in graph A, each of its alternative written forms is added to graph A, with a unique tag denoting affiliation with W, as shown in FIG. 5(c). Also, any, for example, capitalization variants of W are added with the same tag, except those variants that already exist as alternate written forms of W. Finally, interword spacing variations are also added to graph A. A sub-graph B is extracted from graph A that includes all the paths compatible with the current formatted text output, as shown in FIG. 5(d). Additionally, a sub-graph C is extracted from A that includes all paths compatible with the user-corrected text, as shown in FIG. 5(e). In case C is empty, the correction is deemed to be not formatting related, because no formatter parameter setting can produce it. In one preferred embodiment, the sub-graphs B and C are extracted only conceptually, without the need for an explicit representation. A tag-set $T_B$ that includes all tags that appear in sub-graph B and a tag-set $T_C$ with all the tags that appear in sub-graph C is then built, as shown in FIG. 5(f). In a preferred embodiment, paths including conflicting associated tags are omitted from consideration during the construction of these sets. The tag-sets $T_B$ and $T_C$ are then compared, as shown in FIG. 5(g). A preferred embodiment specifically looks for tags that are in one set but not the other (Boolean parameters), and for differences in tags that are associated with each other (multi-choice parameters and alternate spellings). For example, the Expand Contractions tag being present in $T_C$ but not in $T_B$ suggests that the associated (Boolean) "expand contractions" formatting parameter should be activated. The option(s) may then, without limitation, be provided to the user to change the format parameter settings. In various embodiments, prior to providing the option(s) to the user, the formatting effects of each option may be performed on the token sequence, as shown in FIG. 5(h), ensuring that the new formatting settings result in the desired user-correction. Options that fail this test may be, without limitation, rejected and not presented to the user.

In accordance with another embodiment of the invention, a computer implemented method, system, or computer program product for formatting text in a speech recognition system includes changing a formatting setting associated with the speech recognition system based, at least in part, on the formatting of pre-existing text. The change in formatting setting may occur upon a user correction to text output from the speech recognition system (similar to above-described embodiments) or alternatively, without a user correction to text output.

In such embodiments, an adaptation component, for example, may review the pre-existing text to determine how many times a particular formatting setting was applied and/or not applied, in determining whether a change in a formatting setting is warranted. The pre-existing text may be pre-existing text associated with the user, such as text previously dictated by the user. Alternatively, the pre-existing text may not be associated with the user and may instead be text dictated or written by another user or author, respectively. Explicit confirmation from the user may be required before changing the formatting setting. For example, as described above, a user interface may provide an option(s) to change the formatting setting, which the user can then accept or decline. As in above-described embodiments, the formatting setting may be associated with, for example, and without limitation, a spacing, a numbering, a spelling variation, a capitalization, an abbreviation, a contraction, a number, a unit of measure, a price, a date, an address, an e-mail address, a web address, a phone number, masking of foul language, a legal citation, a dosage, a blood pressure and/or a vertebra number. Furthermore, similar to above-described embodiments, weighting may be utilized. For example, recent occurrences of pre-existing text may be weighed more heavily than older occurrences.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible and/or non-transitory medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer implemented method of formatting text in a speech recognition system, the method comprising:
   determining if a user correction to a text output from the speech recognition system can be accomplished by changing a formatting setting associated with the speech recognition system; and
   changing the formatting setting based, at least in part, on an inferential indication that the change to the formatting setting is acceptable to the user and/or an explicit confirmation from the user that the change to the formatting setting is acceptable.

2. The method according to claim 1, wherein changing the formatting setting based on an explicit confirmation from the user includes:
   providing via a user interface at least one option to the user to change the formatting setting; and
   changing the formatting setting if the user accepts one or more of the options.

3. The method according to claim 2, the method further comprising:
   prior to providing the at least one option to the user to change the formatting setting, testing each option to change to the formatting setting by:
      formatting the text output with the change to the formatting setting incorporated to produce a candidate text;
      comparing the user correction to the candidate text;
      if the candidate text matches the user correction to the text output, provide the option to the user; and
      if the candidate text does not match the user correction to the text output, do not provide the option to the user.

4. The method according to claim 1, wherein changing the formatting setting based on an inferential indication includes:
   monitoring previously made corrections; and
   changing the formatting setting based, at least in part, on the previously made corrections.

5. The method according to claim 1, wherein the formatting setting is associated with a spacing, a numbering, a spelling variation, a capitalization, an abbreviation, a contraction, a number, a unit of measure, a price, a date, a time, an address, an e-mail address, a web address, a phone number, masking of foul language, a legal citation, a dosage, a blood pressure and/or a vertebra number.

6. The method according to claim 1, wherein determining if a user correction to text output from the speech recognition system can be accommodated by changing a formatting setting associated with the speech recognition system includes:
   using a formatting graph representing alternative formatted texts of a token sequence associated with the text output.

7. A speech recognition system for outputting text based on a spoken utterance, the system comprising:
   at least one processor configured to implement an adaptation component for:
      determining if a user correction to text output from the speech recognition system can be accomplished by changing a formatting setting associated with the speech recognition system; and
      changing the formatting setting based, at least in part, on an inferential indication that the change to the formatting setting is acceptable to the user and/or an explicit confirmation from the user that the change to the formatting setting is acceptable.

8. The system according to claim 7, further comprising:
   a user interface for providing at least one option to the user to change the formatting setting, and upon which the user can provide explicit confirmation that one or more of the options to change the formatting setting is acceptable.

9. The system according to claim 8, wherein prior to providing the at least one option to the user to change the formatting setting, the adaptation component tests each option to change the formatting by:
   formatting the text output, with the change to the formatting setting incorporated, to produce a candidate text;
   if the candidate text matches the user correction to the text output, provide the option to the user; and
   if the candidate text does not match the user correction to the text output, do not provide the option to the user.

10. The system according to claim 7, wherein the inferential indication is based, at least in part, on previous corrections to formatted text monitored by the adaptation component module.

11. The system according to claim 7, wherein the formatting setting is associated with a spacing, a numbering, a spelling variation, a capitalization, an abbreviation, a contraction, a number, a unit of measure, a price, a date, an address, an e-mail address, a web address, a phone number, masking of foul language, a legal citation, a dosage, a blood pressure and/or a vertebra number.

12. The system according to claim 1, wherein the adaptation component uses a formatting graph representing alternative formatted texts of the output in determining if a user correction to text output from the speech recognition system can be accommodated by changing a formatting setting associated with the speech recognition system.

13. A computer implemented method of formatting text in a speech recognition system, the method comprising:
   determining if a user correction to a text output from the speech recognition system can be accomplished by changing a formatting setting associated with the speech recognition system; and
   changing the formatting setting associated with the speech recognition system based, at least in part, on the formatting of pre-existing text.

14. The method according to claim 13, wherein changing the formatting setting includes:
   changing the formatting setting only after receiving explicit confirmation from a user that the change to the formatting setting is acceptable.

15. The method according to claim 14, wherein changing the formatting setting includes:
   providing via a user interface at least one option to a user to change the formatting setting; and
   changing the formatting setting if the user accepts one or more of the options.

16. The method according to claim 13, wherein the formatting setting is associated with a spacing, a numbering, a spelling variation, a capitalization, an abbreviation, a contraction, a number, a unit of measure, a price, a date, a time, an address, an e-mail address, a web address, a phone number, masking of foul language, a legal citation, a dosage, a blood pressure and/or a vertebra number.

17. A speech recognition system for outputting text based on a spoken utterance, the system comprising:
   at least one processor configured to implement an adaptation component for:
      determining if a user correction to text output from the speech recognition system can be accomplished by changing a formatting setting associated with the speech recognition system; and
      changing the formatting setting associated with the speech recognition system based, at least in part, on the formatting of pre-existing text.

18. The system according to claim 17, wherein the adaptation component is further configured to change the formatting setting only after receiving explicit confirmation from a user that the change to the formatting setting is acceptable.

19. The system according to claim 18, further comprising:
   a user interface for providing at least one option to a user to change the formatting setting, and upon which the user can provide explicit confirmation that one or more of the options to change the formatting setting is acceptable.

20. The system according to claim 17, wherein the formatting setting is associated with a spacing, a numbering, a spelling variation, a capitalization, an abbreviation, a contraction, a number, a unit of measure, a price, a date, an address, an e-mail address, a web address, a phone number, masking of foul language, a legal citation, a dosage, a blood pressure and/or a vertebra number.

* * * * *